United States Patent
Ackerman

(10) Patent No.: US 9,581,447 B2
(45) Date of Patent: Feb. 28, 2017

(54) MEMS GYRO MOTOR LOOP FILTER

(71) Applicant: Honeywell International Inc., Morristown, NJ (US)

(72) Inventor: John F. Ackerman, Mounds View, MN (US)

(73) Assignee: Honeywell International Inc., Morris Plains, NJ (US)

( * ) Notice: Subject to any disclaimer, the term of this patent is extended or adjusted under 35 U.S.C. 154(b) by 248 days.

(21) Appl. No.: 14/325,674

(22) Filed: Jul. 8, 2014

(65) Prior Publication Data
US 2016/0010994 A1 Jan. 14, 2016

(51) Int. Cl.
*G01C 19/56* (2012.01)
*G01C 19/5776* (2012.01)
*G01C 19/5607* (2012.01)
*G01C 19/5649* (2012.01)
*G01C 19/5642* (2012.01)
*G01C 19/5719* (2012.01)

(52) U.S. Cl.
CPC ......... *G01C 19/5776* (2013.01); *G01C 19/56* (2013.01); *G01C 19/5607* (2013.01); *G01C 19/5642* (2013.01); *G01C 19/5649* (2013.01); *G01C 19/5719* (2013.01)

(58) Field of Classification Search
CPC .................................................. G01C 19/56
USPC ...................................................... 73/504.12
See application file for complete search history.

(56) References Cited

U.S. PATENT DOCUMENTS

| 3,559,492 A | 2/1971 | Erdley |
| 3,987,555 A | 10/1976 | Haagens et al. |
| 4,267,735 A * | 5/1981 | Valles ............... G01C 19/08 318/3 |
| 4,577,168 A * | 3/1986 | Hartmann ........... H03H 9/6409 333/170 |

(Continued)

FOREIGN PATENT DOCUMENTS

| EP | 1918723 | 5/2008 |
| EP | 2259019 | * 6/2010 ............ G01C 19/56 |

(Continued)

OTHER PUBLICATIONS

Wilson, Brian C. et Al., 'Implementation of the Generalized Complementary Flux Constraint for Low-Loss Active Magnetic Bearings', Jan. 2005, pp. 1-16, Publisher: American Institute of Aeronautics and Astronautics.*

(Continued)

*Primary Examiner* — Clayton E LaBalle
*Assistant Examiner* — Kevin Butler
(74) *Attorney, Agent, or Firm* — Fogg and Powers LLC

(57) ABSTRACT

A motor drive loop circuit for a micro-electro-mechanical system (MEMS) gyroscope is provided. The motor drive loop circuit includes a motor configured to drive a proof mass in the MEMS gyroscope and a minus-90-degree phase-shift twin-tee notch filter. The motor is configured to cause the proof mass to oscillate at a primary-proof-mass mode. The a minus-90-degree phase-shift twin-tee notch filter is configured to: provide a minus 90 degree phase at a motor resonance frequency equal to the primary-proof-mass mode; suppress resonance at undesired mechanical modes of the motor during a startup of the motor; and provide gain at the motor resonance frequency.

16 Claims, 9 Drawing Sheets

(56) References Cited

U.S. PATENT DOCUMENTS

| | | | | |
|---|---|---|---|---|
| 5,138,883 | A | * | 8/1992 | Paquet ............... G01C 19/30 73/504.18 |
| 5,375,451 | A | * | 12/1994 | Sandstrom ............ G01N 3/56 73/577 |
| 5,576,976 | A | * | 11/1996 | White ............... H03H 17/025 333/17.1 |
| 6,009,751 | A | * | 1/2000 | Ljung ............... G01C 19/5719 73/504.02 |
| 6,845,668 | B2 | * | 1/2005 | Kim ............... B81B 3/0062 73/504.12 |
| 6,915,693 | B2 | * | 7/2005 | Kim ............... G01C 19/5762 73/504.12 |
| 7,036,373 | B2 | * | 5/2006 | Johnson ............ G01C 19/5719 73/504.02 |
| 7,275,433 | B2 | * | 10/2007 | Caminada ........ G01C 19/5726 73/503.3 |
| 7,832,271 | B2 | * | 11/2010 | Mita ............... G01C 19/574 73/504.04 |
| 8,714,012 | B2 | * | 5/2014 | Caminada ........ G01C 19/5762 73/504.12 |
| 8,789,416 | B2 | * | 7/2014 | Rocchi ............. G01C 19/574 73/504.04 |
| 8,810,331 | B2 | * | 8/2014 | Gu ............... H03H 7/0153 333/17.1 |
| 9,146,109 | B2 | * | 9/2015 | Magnoni ........... G01C 19/5726 |
| 2003/0183006 | A1 | * | 10/2003 | Platt ............... G01C 19/5719 73/504.12 |
| 2003/0200804 | A1 | * | 10/2003 | Johnson ............ G01C 19/56 73/504.12 |
| 2005/0210977 | A1 | * | 9/2005 | Yan ............... G01C 19/5719 73/504.02 |
| 2007/0062282 | A1 | * | 3/2007 | Akashi ............ G01C 19/5719 73/504.12 |
| 2007/0089512 | A1 | * | 4/2007 | Matsuhisa .......... G01C 19/56 73/514.16 |
| 2010/0116050 | A1 | * | 5/2010 | Wolfram ........... G01C 19/574 73/504.12 |
| 2010/0307241 | A1 | * | 12/2010 | Raman ............. G01C 19/56 73/504.12 |
| 2011/0259100 | A1 | * | 10/2011 | Chen ............... G01C 19/5726 73/504.12 |
| 2013/0111991 | A1 | * | 5/2013 | Takizawa ......... G01C 19/5747 73/504.12 |
| 2013/0139592 | A1 | * | 6/2013 | Acar ............... G01C 19/5712 73/504.12 |
| 2013/0283908 | A1 | * | 10/2013 | Geen ............... G01C 19/574 73/504.12 |
| 2014/0245831 | A1 | * | 9/2014 | Furuhata .......... G01C 19/574 73/504.12 |
| 2015/0033853 | A1 | * | 2/2015 | Zhang ............. G01P 15/14 73/504.12 |
| 2016/0010994 | A1 | * | 1/2016 | Ackerman ........ G01C 19/5776 73/504.12 |

FOREIGN PATENT DOCUMENTS

| | | | | |
|---|---|---|---|---|
| EP | 2259019 | | 12/2010 | |
| EP | 2413098 | | 2/2012 | |
| EP | 2977723 | * | 6/2015 | ........ G01C 19/5776 |
| EP | 2977723 | * | 1/2016 | ........ G01C 19/5756 |

OTHER PUBLICATIONS

Raman J., 'A Closed-loop Digitally Controlled MEMS Gyroscope With Unconstrained Sigma-Delta Force-Feedback', IEEE Sensors Journal, vol. 9, No. 3, pp. 297-305, Mar. 2009.*
Ismail A., 'A High Performance MEMS Based Digital-Output Gyroscope', IEEE Transducers, 2013 IEEE.*
Frank Saggio, 'A Notch Filter for the Spin Component of a Two-Axis Gyro', SLI Avionic Systems Corp, IEEE, Jun. 1989.*
Y.X. Liu, 'Design of a Digital Closed Control Loop for the Sensse Mode of a Mode-matching MEMS Vibratory Gyroscope', IEE International NanoMicro Engineered and Molecular Systems, Apr. 13-16, 2014.*
Stefano Dellea, 'Design of a high-performance MEMS gyroscope', MEMS and Microsensors, pp. 1-9, Apr. 11, 2015.*
Madison E. Martin, 'Discrete Digital Filter Design for Microelectromechanical Systems (MEMS) Accelerometers and Gyroscopes', Wilkes Honors College of Florida Atlantic University, Jupiter, Florida, May 2010.*
Joel Voldman, course materials for 6.777J / 2.372J Design and Fabrication of MicroelectromechanicalDevices, Spring 2007. MIT OpenCourseWare(http://ocw.mit.edu/), Massachusetts Institute of Technology. Downloaded on [06 Month 2016].*
Wilson Brian C. et al., 'Implementation of the Generalized Complementary Flux Constraint for Low-Loss Active Magnetic Bearings', American Institute of Aeronautics and Astronautics, 01, 2005, pp. 1-16.*
Honeywell International Inc., European Search Report 'Mems Gyro Motor Loop Filter', European Patent Office, EP15171987, Mar. 2, 2016, pp. 5.*
Martin, Madison E. 'Thesis Discrete Digital Filter Design for Microelectromechanical Systems (MEMS) Accelerometer and Gyroscope's', Wilkes Honors College of Florida Atlantic University, May 2010, pp. 65.*
Dellea, Stefano, 'Design of a high-performance MEMS gyroscope', MEMS and Microsensors, Apr. 11, 2015, pp. 9.*
Liu, Y.X., 'Design of a Digital Closed Control Loops for the Sense Mode of a Mode-matching MEMS Vibratory Gyroscope', IEEE International Conference Nano/Micro Engineered and Molecular Systems, Apr. 13-16, 2014, pp. 5.*
Saggio, Frank III, 'A Notch Filter for the Spin Component of a Two-Axis Gyro', SLI Avionic Systems Corp, Jan. 1989, pp. 2.*
Ismail, A. 'A High Performance MEMS Based Digital-Output Gyroscope', IEEE, Jun. 16-20, 2013, 4 pgs.*
Raman, J. 'A Closed-loop Digitally Controlled MEMS Gyroscope With Unconstrained Sigma-Delta Force-Feedback', IEE Sensors Journal, Mar. 2009, vol. 9 No. 3, pp. 297-305.*
European Patent Office, "Extended European Search Report from EP Application No. 15171987.9 mailed Feb. 3, 2016", "from Foreign Counterpart of U.S. Appl. No. 14/325,674", Feb. 3, 2016, pp. 15, Published in: EP.
Wilson et al., "Implementation of the Generalized Complementary Flux Constraint for Low-Loss Active Magnetic Bearings", Jan. 2005, pp. 1-16, Publisher: American Institute of Aeronautics and Astronautics.

* cited by examiner

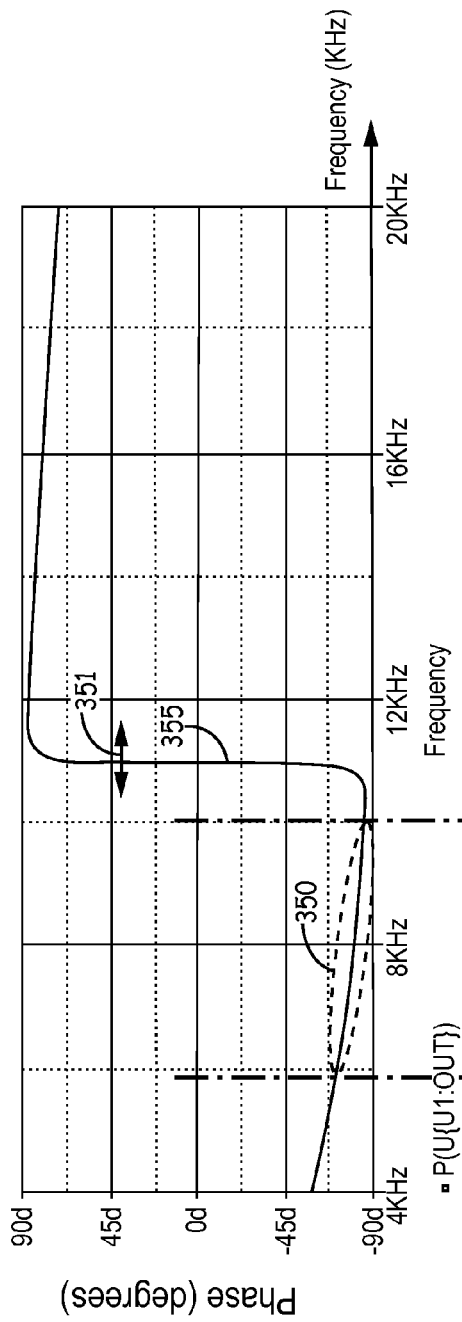
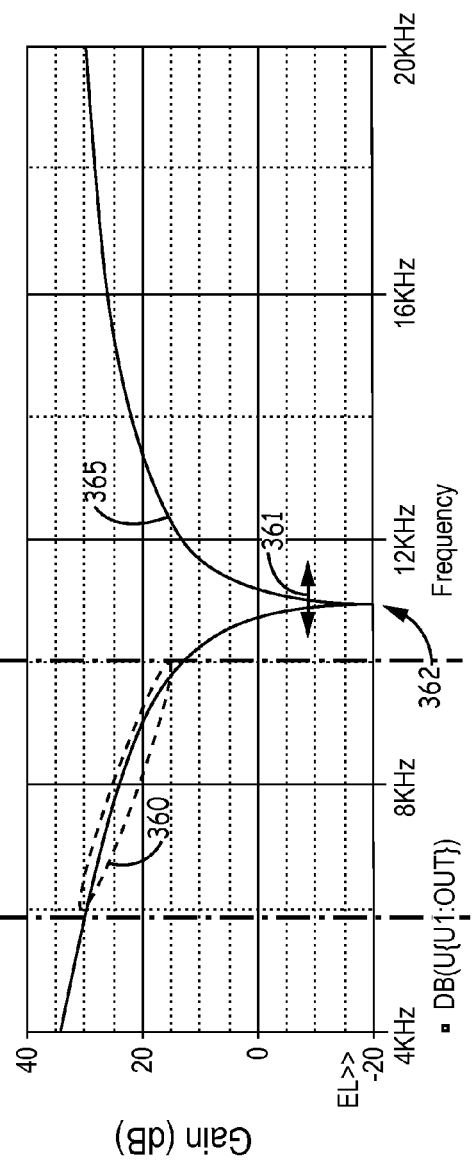
FIG. 4A
FIG. 4B

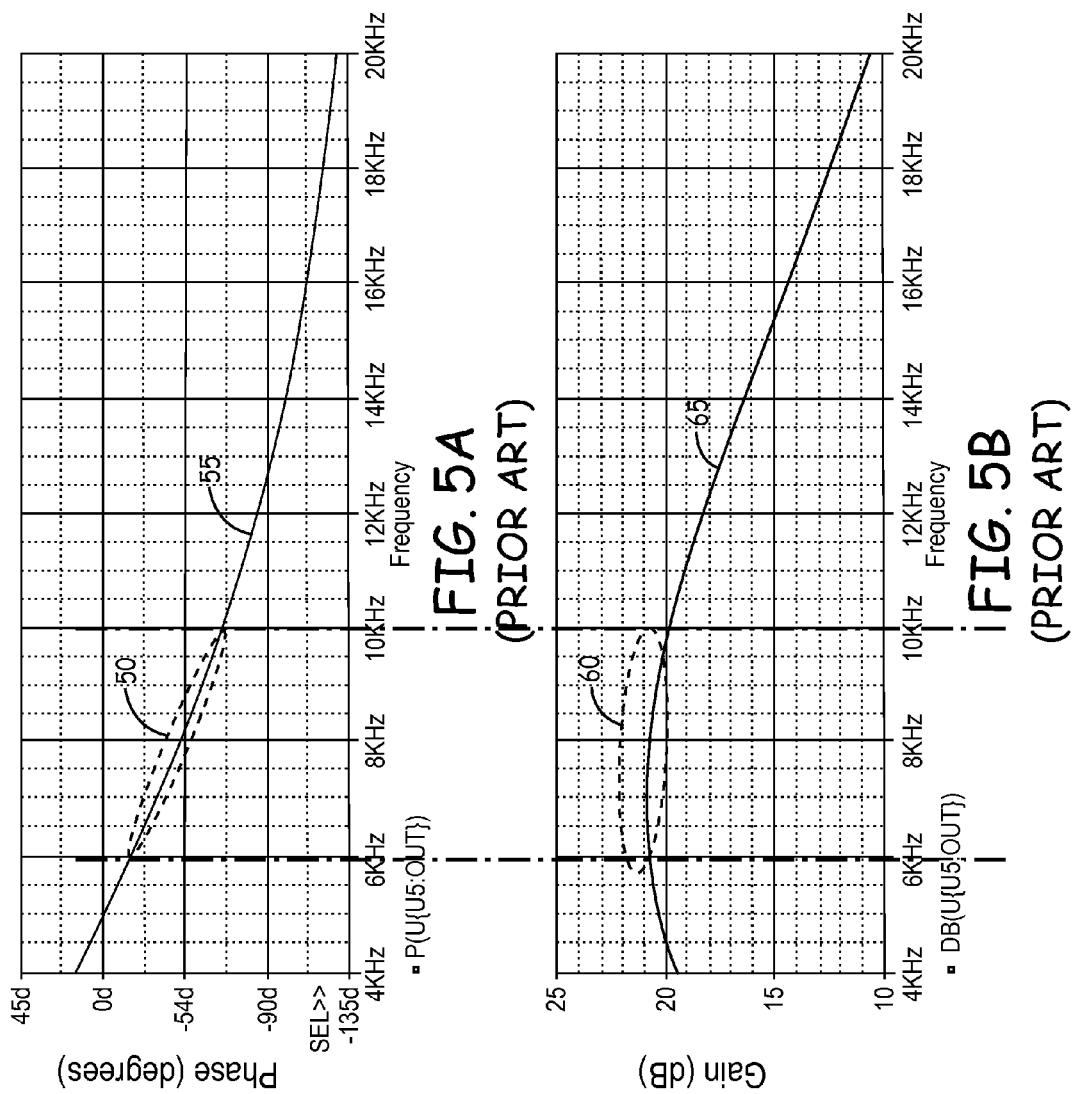

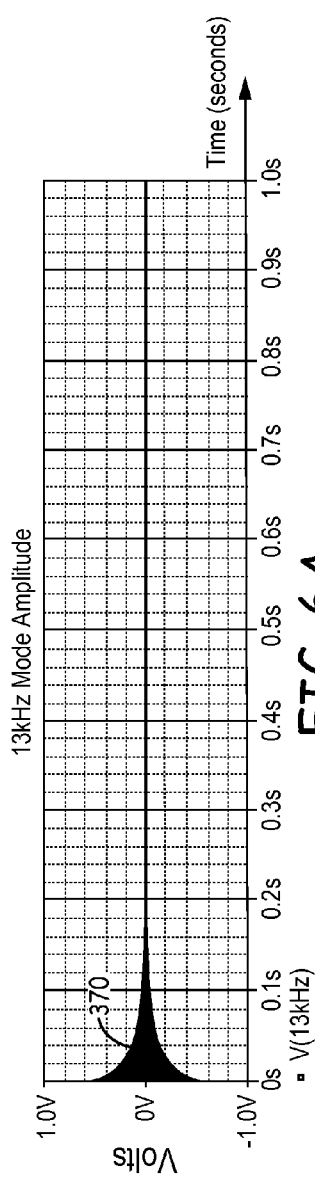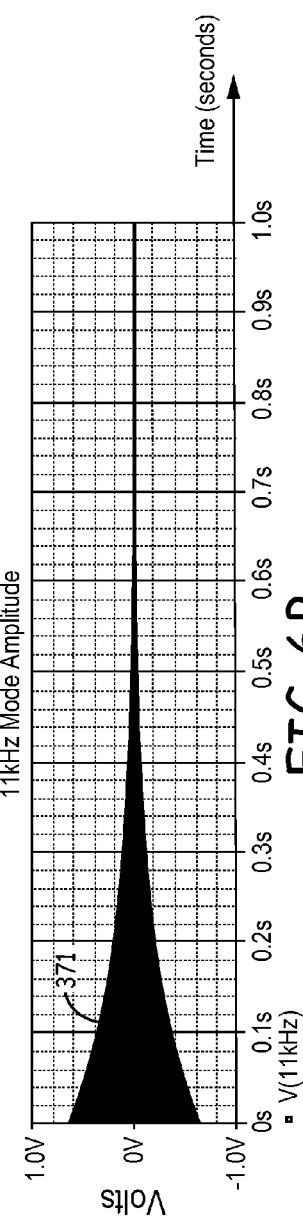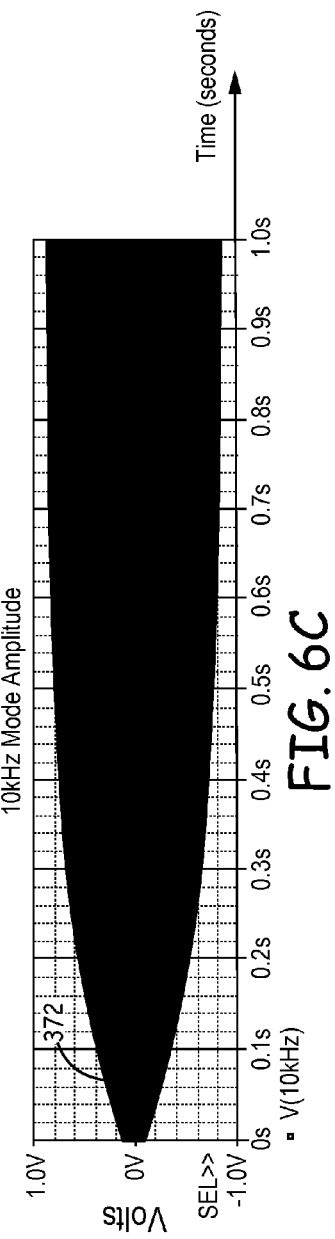

MEMS GYRO MOTOR LOOP FILTER

BACKGROUND

A fast micro-electro-mechanical system (MEMS) gyro motor startup time is critical for many applications. The MEMS gyro motor has several undesired mechanical modes of vibration that can compete with the primary-proof-mass mode used to drive the proof mass. These undesired mechanical modes of vibration delay the startup time of a MEMS gyro motor. The motor drive control loop for a gyroscope contains a filter function that provides a −90 degree phase shift necessary for oscillation. The filter in the motor drive control loop plays an important part in suppressing the competing modes. The suppression of competing modes provided by the current filter topology is weak and allows those modes to delay startup of the MEMS gyro motor.

SUMMARY

The present application relates to a motor drive loop circuit for a micro-electro-mechanical system (MEMS) gyroscope. The motor drive loop circuit includes a motor configured to drive a proof mass in the MEMS gyroscope and a minus-90-degree phase-shift twin-tee notch filter. The motor is configured to cause the proof mass to oscillate at a primary-proof-mass mode. The a minus-90-degree phase-shift twin-tee notch filter is configured to: provide a minus 90 degree phase at a motor resonance frequency equal to the primary-proof-mass mode; suppress resonance at undesired mechanical modes of the motor during a startup of the motor; and provide gain at the motor resonance frequency.

DRAWINGS

Understanding that the drawings depict only exemplary embodiments and are not therefore to be considered limiting in scope, the exemplary embodiments will be described with additional specificity and detail through the use of the accompanying drawings, in which:

FIG. 4A is a plot of phase versus frequency for the twin-tee filter circuit diagram of FIG. 3B;

FIG. 4B is a plot of gain versus frequency for the twin-tee filter circuit diagram of FIG. 3B;

FIG. 5A is a plot of phase versus frequency for a prior art filter in a motor drive loop circuit;

FIG. 5B is a plot of gain versus frequency for a prior art filter in a motor drive loop circuit;

FIGS. 6A-6C are plots of voltage versus time for a first and second undesired mechanical frequency modes and a drive frequency mode, respectively, shown in the circuit diagram of FIG. 3B;

Figure 3A:
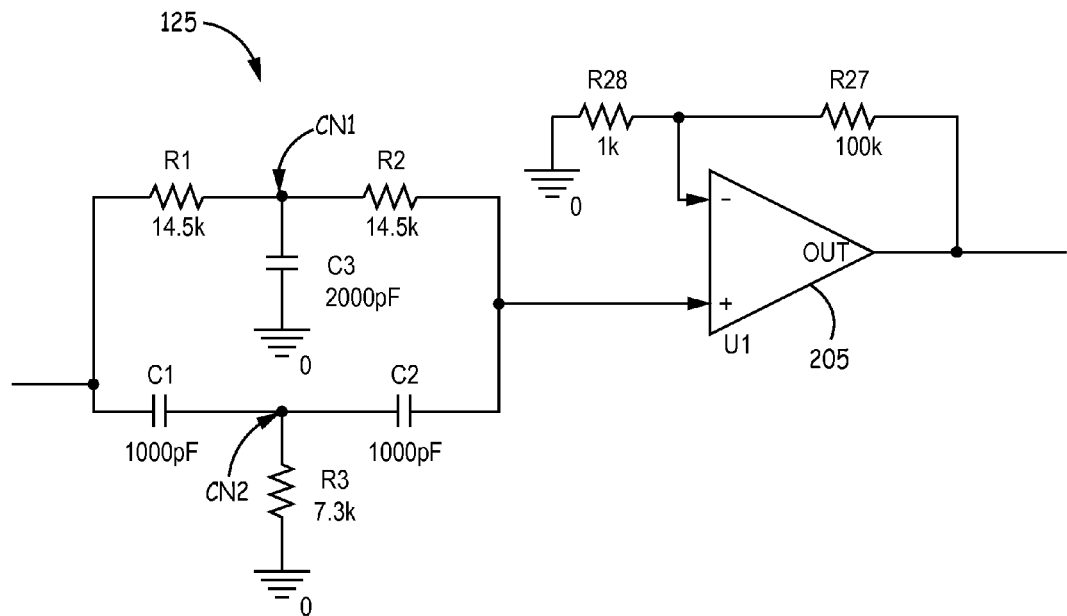
FIG. 3A is a twin-tee filter circuit diagram for a motor drive loop circuit in a MEMS gyroscope in accordance with the present application.
Figure 3B:
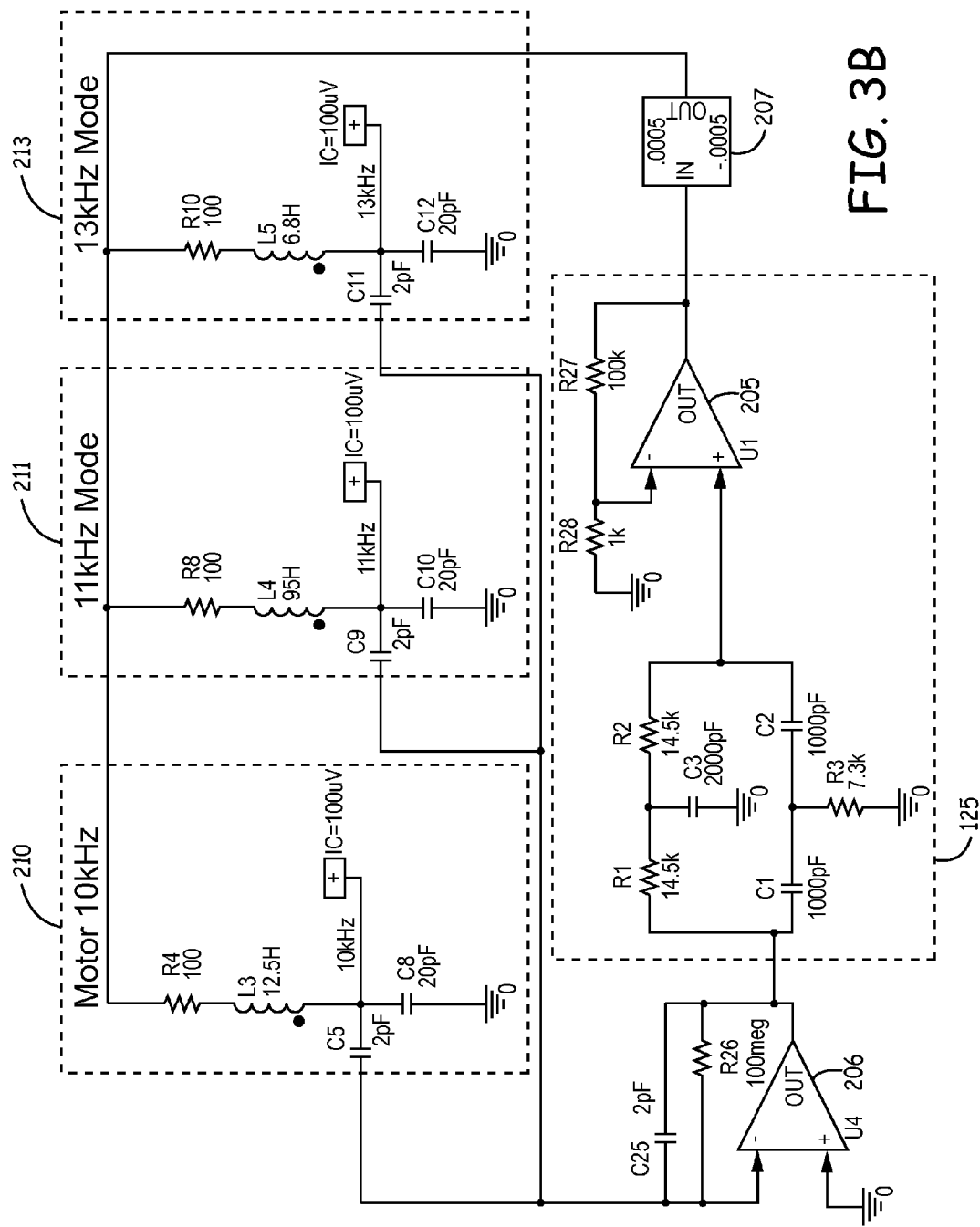
FIG. 3B is the twin-tee filter circuit diagram of FIG. 3A in series with a simulated drive frequency mode and two undesired mechanical frequency modes associated with a motor drive loop circuit.
Figures 7A, 7B, 7C:
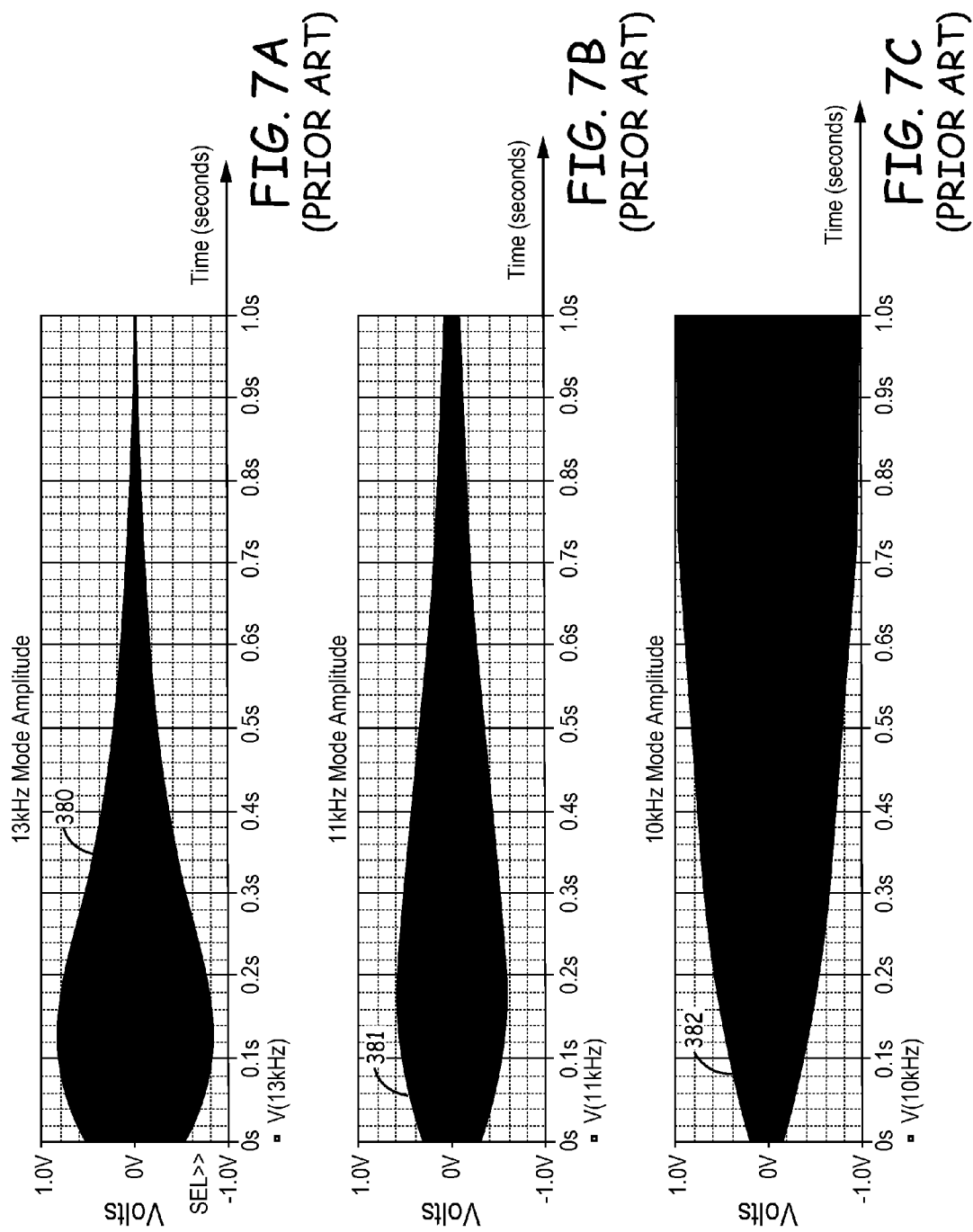
Figure 8:
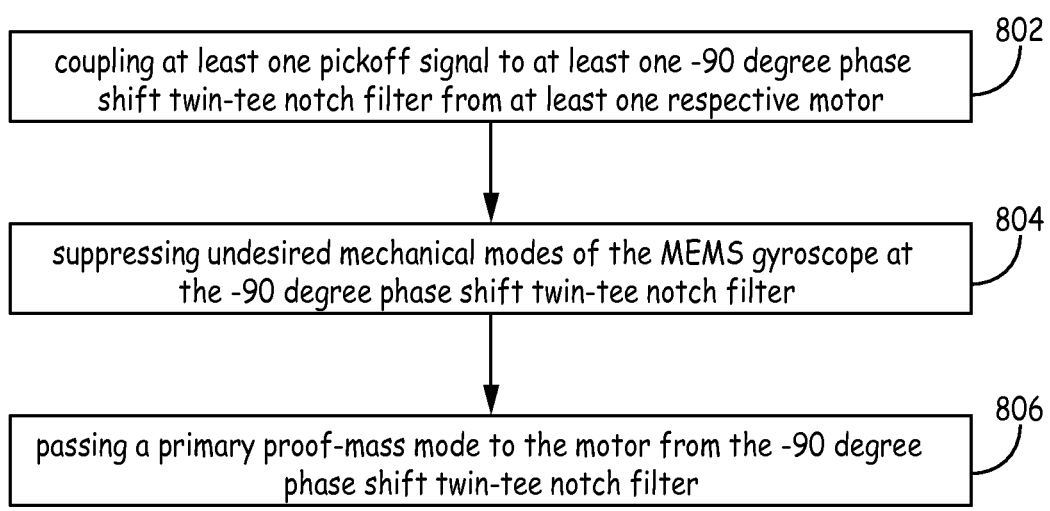

FIGS. 7A-7C are plots of voltage versus time for a first and second undesired mechanical frequency modes and a drive frequency mode, respectively, shown in the circuit diagram of FIG. 3B in which a prior art −90 degree phase shift filter has replaced the filter of the present application; and FIG. 8 is a flow diagram of a method to suppress undesired mechanical modes of a motor drive loop circuit during startup of a MEMS gyro motor.

In accordance with common practice, the various described features are not drawn to scale but are drawn to emphasize specific features relevant to the exemplary embodiments. Reference characters denote like elements throughout figures and text.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

The embodiments described below provide an improved filter in a MEMS gyro motor loop, which is also referred to herein as a "motor drive loop circuit". This filter is based on incorporating a "twin-tee" notch filter topology in the MEMS gyro motor loop. The embodiments of the minus-90-degree phase-shift twin-tee notch filter described herein provide the following advantageous features: 1) a minus 90 degree (−90°) phase shift required for motor oscillation that is flat over a wider frequency range than previous filters to accommodate a wider range of motor frequencies; 2) a voltage gain necessary for oscillation; 3) a rapid phase transition to plus 90 degrees (+90°) phase at a frequency controlled by the filter design; and 4) a strong attenuation in the amplitude response over a narrow range around the phase transition frequency.

The +90 degree phase shift provides strong suppression of undesired mechanical frequency modes at and above the phase transition frequency to reduce the startup time of the MEMS gyro motor in the MEMS gyro motor loop. The prior art filters provide weak suppression through a relatively gradual increase in attenuation and phase shift.

The terms "undesired mechanical frequency mode" and "undesired mechanical mode" are used interchangeably herein. The terms "primary-proof-mass mode" and "drive frequency mode" are used interchangeably herein.

The strong attenuation in the amplitude response over a narrow range around the phase transition frequency provides strong suppression of a mode of vibration at that specific frequency. The improved filter circuit can be implemented with changes to the gyro electronics. In one implementation of this embodiment, an improved filter circuit is implemented with discrete components. In another implementation of this embodiment, an improved filter circuit is implemented by incorporation into a gyro analog application-specific integrated circuit (ASIC).

Figure 1:
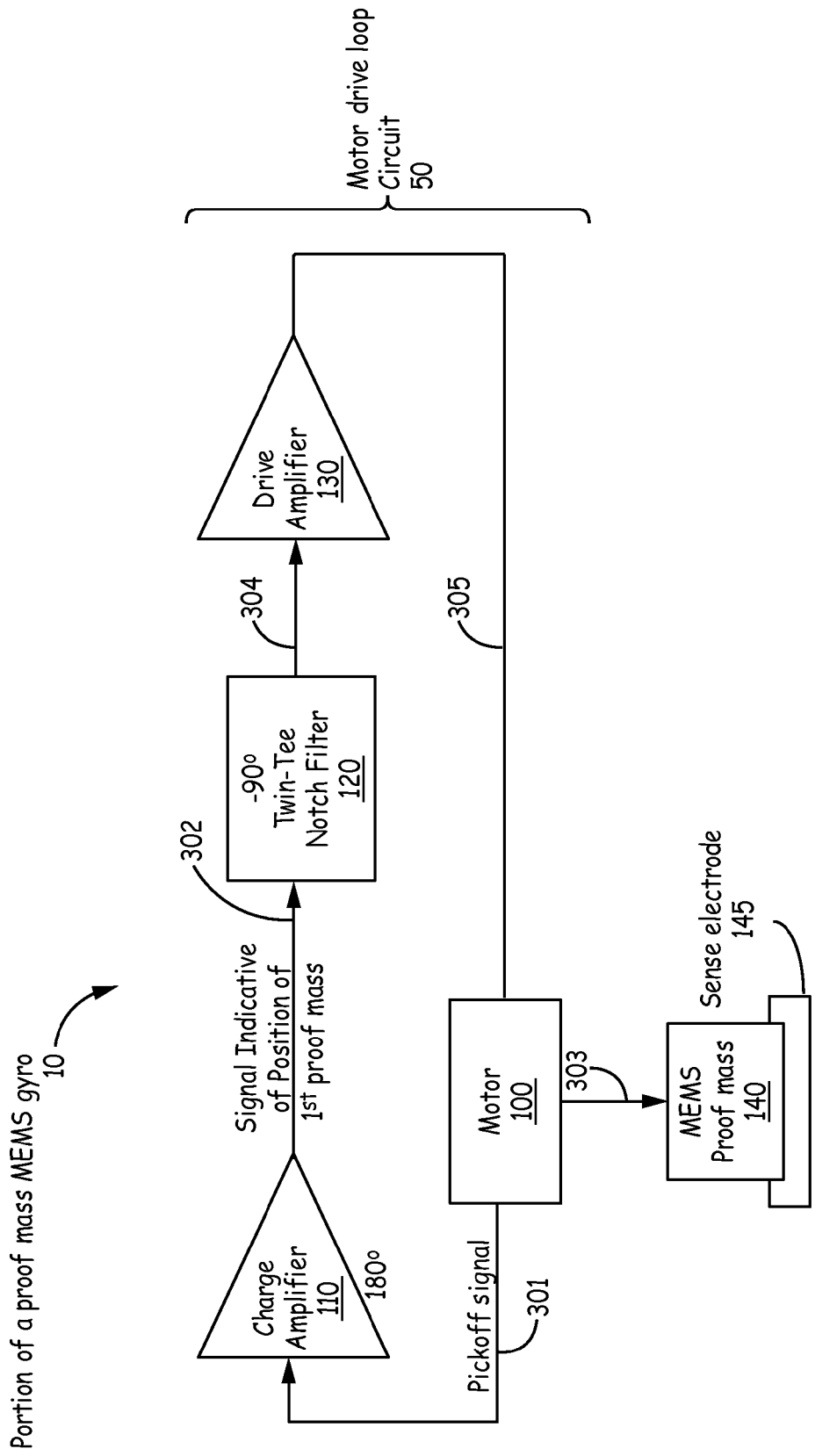
FIG. 1 is a block diagram of a portion of a MEMS gyroscope in accordance with the present application.

FIG. 1 is a block diagram of a portion 10 of a MEMS gyroscope in accordance with the present application. The portion 10 of the MEMS gyroscope includes a motor drive loop circuit 50, a MEMS proof mass 140, and a sense electrode 145. In one implementation of this embodiment, the portion 10 of the MEMS gyroscope is the whole gyroscope 10, which is configured to sense a force in a single direction. The motor drive loop circuit 50 can be used to drive a MEMS proof mass 140 in a MEMS gyroscope 11. The motor drive loop circuit 50 includes a motor 100, a respective minus-90-degree phase-shift twin-tee notch filter 120, a charge amplifier 110, and a drive amplifier 130.

The motor 100 drives a proof mass 140 in the MEMS gyroscope 11. The motor 100 causes the proof mass 140 to oscillate at a primary-proof-mass mode. The terms "motor" and "MEMS gyro motor" are used interchangeably herein. As defined herein a primary-proof-mass mode is the primary oscillatory mode of a proof mass in a gyroscope.

The motor drive loop circuit 50 satisfies Barkhausen criteria for oscillation. Specifically, the loop gain is set equal to one (1) and the phase shift around the motor drive loop circuit is n time 360 degrees, where n is a positive integer. The minus-90-degree phase-shift twin-tee notch filter 120 is configured to: provide a minus 90 degree phase at a motor resonance frequency just above to the at least one primary-proof-mass mode; suppress resonance at mechanical modes of the portion 10 of MEMS gyroscope during a startup of the MEMS gyro motor; and provide gain at the motor resonance frequency.

A pickoff signal 301 is coupled to the charge amplifier 110 from the motor 100. The minus-90-degree phase-shift twin-tee notch filter 120 passes the primary-proof-mass mode (as signal 304) to a drive amplifier 130. The drive amplifier 130 passes the primary-proof-mass mode 305 from the minus-90-degree phase-shift twin-tee notch filter 120 to the motor 100. The motor 100 provides signal 303 to the MEMS proof mass 140 to set the MEMS proof mass 140 oscillating at the primary oscillatory mode of the MEMS proof mass 140.

Figure 2:
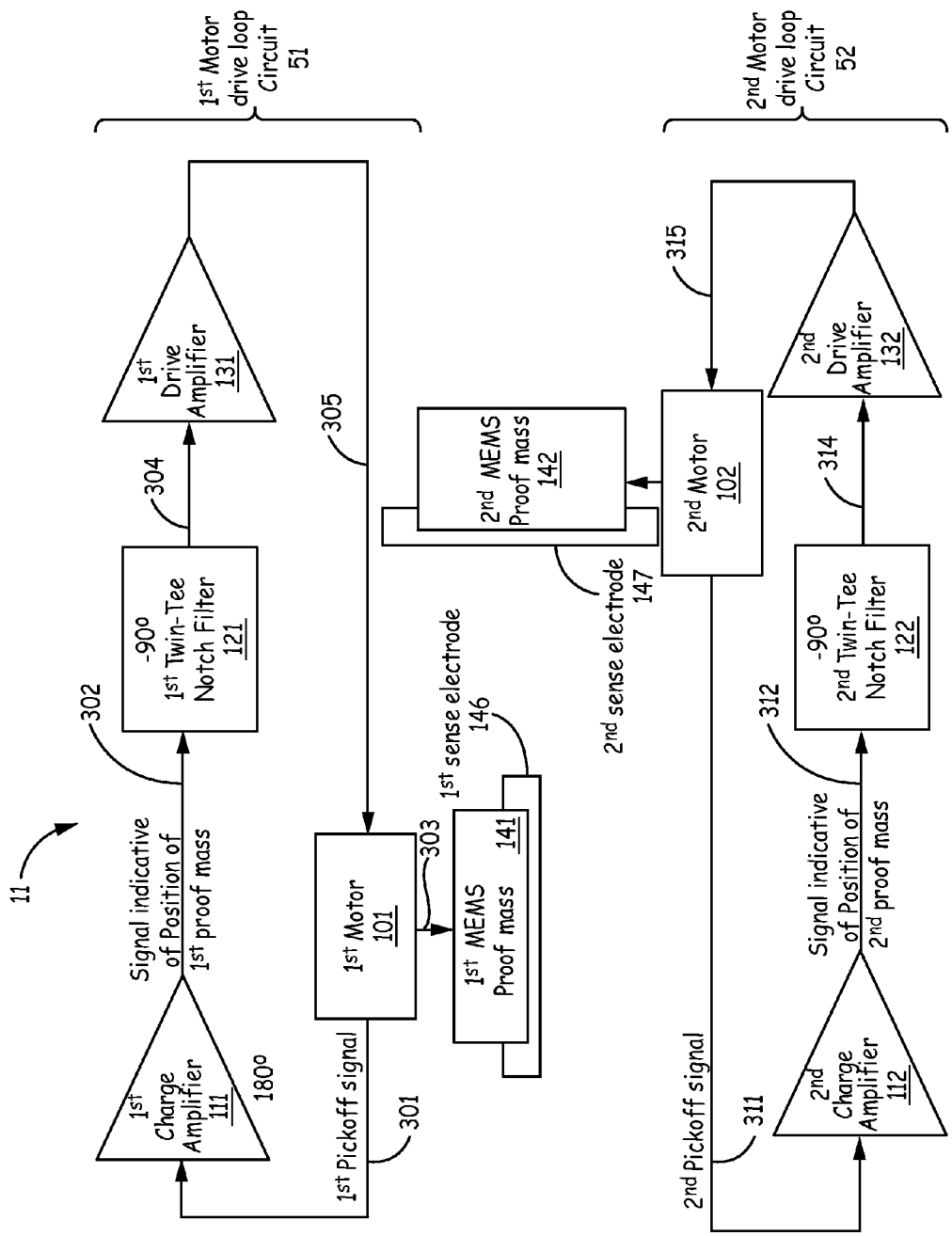
FIG. 2 is a block diagram of a MEMS gyroscope in accordance with the present application.

FIG. 2 is a block diagram of a MEMS gyroscope 11 in accordance with the present application. The MEMS gyroscope 11 includes a first motor drive loop circuit 51, which is associated with a first MEMS proof mass 141 and a first sense electrode 146, and a second motor drive loop circuit 52, which is associated with a second MEMS proof mass 142 and a first sense electrode 147. The first MEMS proof mass 141 and the second MEMS proof mass 142 are arranged to sense two orthogonal forces. As shown in FIG. 2, the first MEMS proof mass 141 is perpendicular to the second MEMS proof mass 142.

The first motor drive loop circuit 51 and the second motor drive loop circuit 52 are similar in structure and function to the motor drive loop circuit 50 described above with reference to FIG. 1. The MEMS gyroscope 11 is also referred to herein as a "MEMS proof-mass gyroscope 11". In one implementation of this embodiment, a gyroscope includes three proof masses that are arranged to sense three forces that are normal to each other. Currently available proof masses and sense electrodes are configurable in a variety of embodiments. The proof masses 141 and 142 described herein are driven to oscillate at a primary proof mass mode, as required for the given configuration of the proof masses 141 and 142 and the associated sense electrodes 146 and 147.

The first motor drive loop circuit 51 includes a first motor 101, a first charge amplifier 111, a first minus-90-degree phase-shift twin-tee notch filter 121, and a first drive amplifier 131. The first motor 101 drives the first proof mass 141 and causes the first proof mass 141 to oscillate at a first primary-proof-mass mode. A first sense electrode 146 senses a position of the first proof mass 141.

The second motor drive loop circuit 52 includes a second motor 102, a second charge amplifier 112, a second minus-90-degree phase-shift twin-tee notch filter 122, and a second drive amplifier 132. The second motor 102 drives the second proof mass 142 and causes the second proof mass 142 to oscillate at a second primary-proof-mass mode. A second sense electrode 147 senses a position of the second proof mass 142. Typically, the first proof mass 141 and second proof mass 142 oscillate at the same primary-proof-mass mode. In one implementation of this embodiment, the first proof mass 141 and the second proof mass 142 oscillate out of phase with each other.

FIG. 3A is a twin-tee filter circuit diagram 125 for a minus-90-degree phase-shift twin-tee notch filter 120 in motor drive loop circuit in a MEMS gyroscope in accordance with the present application. The "twin-tee filter circuit diagram 125" is also referred to herein as "twin-tee circuit 125". The twin-tee filter circuit diagram 125 is applicable to the minus-90-degree phase-shift twin-tee notch filter 120 in motor drive loop circuit 50 shown in FIG. 1. The twin-tee filter circuit diagram 125 is also applicable to the first minus-90-degree phase-shift twin-tee notch filter 121 in the first motor drive loop circuit 51 shown in FIG. 2. The twin-tee filter circuit diagram 125 is also applicable to the second minus-90-degree phase-shift twin-tee notch filter 122 in the second motor drive loop circuit 52 shown in FIG. 2.

The twin-tee circuit 125 includes a first resistor R1 in series with a second resistor R2, a first capacitor C1 in series with a second capacitor C2. The first capacitor C1 is parallel with the first resistor R1 and the second capacitor C2 is parallel with the second resistor R2. A third capacitor C3 connects a common node CN1 of the first resistor R1 and the second resistor R2 to ground and a third resistor R3 connects a common node CN2 of the first capacitor C1 and the second capacitor C2 to the ground. An amplifier 205 has a positive input communicatively coupled to the second resistor R2 and the second capacitor C2. The amplifier 205 has a negative input communicatively coupled to input feedback from an output of the amplifier 205. The feedback is provided to the negative input via a resistor R27. The negative input of the amplifier 205 is connected to ground via a resistor R28.

The second minus-90-degree phase-shift twin-tee notch filter 122 is similarly configured.

FIG. 3B is the twin-tee filter circuit diagram 125 of FIG. 3A in series with a simulated drive frequency mode (e.g., 10 kHz) and two simulated undesired mechanical frequency modes (e.g., 11 kHz and 13 kHz) associated with a motor drive loop circuit 50 (FIG. 1). The circuit configured to simulate a drive frequency mode is shown within dashed block 210. The circuit configured to simulate a first mechanical frequency mode (e.g., a first motor mode) is shown within dashed block 211. The circuit configured to simulate a second mechanical frequency mode (e.g., a second motor mode) is shown within dashed block 213. The twin-tee filter circuit diagram 125 for a minus-90-degree phase-shift twin-tee notch filter 120 in motor drive loop circuit 50 is shown within dashed block 125. An amplifier 206 couples the drive frequency mode 10 kHz and two mechanical frequency modes 11 kHz and 13 kHz associated with a motor 100 to the input of the twin-tee filter circuit diagram 125. Specifically the output from amplifier 206 is connected to the first resistor R1 and the first capacitor C1 in the twin-tee filter circuit diagram 125.

The modeling shown below in FIGS. 4A-4B and 7A-7C are generated at the section 207 shown in FIG. 3B. As is understood by one skilled in the art, the modes to be suppressed and primary-proof-mass mode to drive the MEMS gyro motor are dependent upon the values of the components that form the minus-90-degree phase-shift twin-tee notch filter. However, the following discussion is directed to undesirable mechanical frequency modes at 11 kHz and 13 kHz and a primary-proof-mass mode at 10 kHz, since the modeling was based on those frequencies.

The first mechanical frequency mode 11 kHz and the second mechanical frequency mode 13 kHz prolong the time required for startup of a MEMS gyro motor if these frequencies are not quickly suppressed. The minus-90-degree phase-shift twin-tee notch filter 120 (FIG. 1) is designed to quickly suppress the first mechanical frequency mode 11 kHz and the second mechanical frequency mode 13 kHz to reduce the time required for startup of a MEMS gyro motor 100 (FIG. 1).

FIG. 4A is a plot 355 of phase versus frequency for the twin-tee filter circuit diagram 125 of FIG. 3B. FIG. 4B is a plot 365 of gain versus frequency for the twin-tee filter circuit diagram 125 of FIG. 3B. The twin-tee filter circuit diagram 125 of FIG. 3A is designed for a minus-90-degree phase-shift twin-tee notch filter 120 that provides gain. As shown in FIG. 4A, the frequency region represented generally at 350, which extends from 6 kHz to slightly beyond 10 kHz, is at a phase from −67.5 degrees to −90 degrees. As shown in FIG. 4A, there is a phase-transition point from −90 degrees to +90 degrees at a phase transition frequency at 11 kHz. The phase-transition point is where the phase rapidly transitions between −90 degrees and +90 degrees. By positioning the phase-transition point at or near 11 kHz, a strong suppression of modes greater than or equal to 11 kHz is provided by the minus-90-degree phase-shift twin-tee notch filter. Thus, the twin-tee filter circuit diagram 125 of FIG. 3A is designed to operate in a motor drive loop circuit 50 (FIG. 1) to pass a 10 kHz oscillation to a proof mass 140 with a primary-proof-mass mode of 10 kHz and to suppress mode frequencies greater than or equal to 11 kHz. In one implementation of this embodiment, the mode frequencies greater than or equal to 11 kHz are mechanical modes of the MEMS gyroscope. The double arrow labeled 351 indicates that the phase-transition point at about 11 kHz from −90 degrees to +90 degrees can be tuned by adjusting the values of the resistors and capacitors in the twin-tee filter circuit diagram 125. The designer of the twin-tee circuit 125 for the minus-90-degree phase-shift twin-tee notch filter 120 implements simulation software to adjust the values of the resistors and/or capacitors in the circuit 120 in order to suppress mechanical modes of a MEMS gyroscope 11 during a startup of the motor 100.

As shown in FIG. 4B, a gain notch represented generally at 362 in the gain to less than −20 dB at 11 kHz. Specifically, the gain notch 362 is minimized at the sharp transition at about 11 kHz from −90 degrees to +90 degrees as shown in FIG. 4B. As shown in FIG. 4B, the frequency region represented generally at 360, which extends from 6 kHz to slightly beyond 10 kHz, is at a gain from 30 dB to 15 dB. As the values of the resistors and capacitors in the twin-tee filter circuit diagram 125 are adjusted to shift the sharp phase transition of the plot 355 to a different frequency, the gain notch 362 in the gain curve 365 is also shifted (see double arrow labeled 361) to coincide with the same frequency. The designer of the twin-tee circuit 125 for the minus-90-degree phase-shift twin-tee notch filter 120 implements simulation software to adjust the values of the resistors and/or capacitors in the circuit 120 in order to position the gain notch 362 at a frequency just above the primary-proof-mass mode of the proof mass 140 in a MEMS gyroscope 11 during a startup of the motor 100.

FIG. 5A is a plot 55 of phase versus frequency for a prior art filter in a motor drive loop circuit. FIG. 5B is a plot 65 of gain versus frequency for a prior art filter in a motor drive loop circuit. As shown in FIG. 5A, the frequency region represented generally at 50, which extends from 6 kHz to slightly beyond 10 kHz, is at a phase from about −20 degrees to −67.5 degrees. The desired phase-transition point from −90 degrees to +90 degrees is not near the primary-proof-mass mode of 10 kHz and in fact is well beyond 10 kHz. Likewise, as shown in FIG. 5B, there is no gain notch positioned at a frequency just above the primary-proof-mass mode of the proof mass 140 in a motor drive loop circuit 50. As shown in FIG. 5B, the frequency region represented generally at 60, which extends from 6 kHz to slightly beyond 10 kHz, is almost flat with a gain of around 21 dB. Thus, the prior art filter for a MEMS gyro motor in a MEMS gyroscope is unable to suppress the undesired frequency modes during startup of a MEMS gyro motor.

FIGS. 6A-6C are plots 370, 371, and 372 of voltage versus time for the two undesired mechanical frequency modes at 11 kHz and 13 kHz and the drive frequency mode at 10 kHz shown in the circuit diagram of FIG. 3B. FIGS. 7A-7C are plots 380, 381, and 382 of voltage versus time for first and second undesired mechanical frequency modes and a drive frequency mode, respectively, shown in the circuit diagram of FIG. 3B in which a prior art −90 degree phase shift filter has replaced the filter of the present application.

As shown in FIG. 6A, the 13 kHz mechanical frequency mode is attenuated by the minus-90-degree phase-shift twin-tee notch filter 120 in approximately 0.1 seconds. As shown in FIG. 7A, the prior art filter takes about 1 second to attenuate the 13 kHz mechanical frequency mode to the same extent. In fact, the prior art filter amplifies the 13 kHz mechanical frequency mode at about 0.1 seconds before attenuating the undesired 13 kHz mechanical frequency mode.

As shown in FIG. 6B, the minus-90-degree phase-shift twin-tee notch filter 120 takes about 0.4 seconds to attenuate the 11 kHz mechanical frequency mode to +/−0.1 volts. The minus-90-degree phase-shift twin-tee notch filter 120 takes 0.8 seconds to essentially eliminate the 11 kHz mechanical frequency mode. As shown in FIG. 7B, in 1 second, the prior art filter has only attenuated the 11 kHz mechanical frequency mode to +/−0.2 volts. In fact, the prior art filter amplifies the undesired 11 kHz mechanical frequency mode at about 0.15 seconds before attenuating the 11 kHz mechanical frequency mode.

A comparison of FIGS. 6C and 7C shows that the amplitude of the desired primary-proof-mass mode at 10 kHz for the minus-90-degree phase-shift twin-tee notch filter 120 exceeds that of the prior art filter at all times after start up of the MEMS gyro motor 100. For example, at 0.1 seconds, the minus-90-degree phase-shift twin-tee notch filter 120 provides an amplitude of +/−2 volts at 10 kHz while the prior art filter provides an amplitude of +/−1.5 volts at 10 kHz (note that FIG. 6C has a vertical range from +5 volts to −5 volts, while FIG. 7C has a vertical range from +4 V to −4 volts).

FIG. 8 is a flow diagram of a method 800 to suppress undesired mechanical modes of a motor drive loop circuit 50 during startup of a MEMS gyro motor 100 (FIG. 1) in a portion of a gyroscope 10 or in a gyroscope 11 of FIG. 1 or 2, respectively. For the gyroscope 11 of FIG. 2, method 800 is applicable to the first proof mass 141 and the second proof mass 142 that are arranged to sense orthogonal forces.

At block 802, at least one pickoff signal 301 is coupled to at least one respective minus-90-degree phase-shift twin-tee notch filter 120 from at least one respective motor 100 configured to drive at least one respective proof mass 140 in the MEMS gyroscope 11.

For the MEMS gyroscope 11 shown in FIG. 2, a first pickoff signal 301 is coupled to a first charge amplifier 111, which amplifies the first pickoff signal 301. The first charge amplifier 111 inputs a first pickoff signal 301 from the first motor 101 and outputs a signal 302 representative of a position of the first proof mass 141 to the first minus-90-degree phase-shift twin-tee notch filter 121. In this manner, the first pickoff signal 301 is coupled to a first minus-90-degree phase-shift twin-tee notch filter 121 from the first motor 101 that is configured to drive a first proof mass 141.

A second pickoff signal 311 is coupled to a second charge amplifier 112, which amplifies the second pickoff signal 311. The second charge amplifier 112 inputs the second pickoff signal 311 from the second motor 102 and outputs a signal 312 representative of a position of the second proof mass 142 to the second minus-90-degree phase-shift twin-tee notch filter 122. In this manner, the second pickoff signal 311 is coupled to the second minus-90-degree phase-shift twin-tee notch filter 122 from the second motor 102 that is configured to drive a second proof mass 142.

At block 804, undesired mechanical modes of the MEMS gyroscope 11 are suppressed at the at least one respective minus-90-degree phase-shift twin-tee notch filter 120. In one implementation of this embodiment, a frequency for a phase-transition point of the at least one respective minus-90-degree phase-shift twin-tee notch filter 120 is adjusted to suppress the undesired mechanical modes of the MEMS gyroscope 11. In another implementation of this embodiment, a frequency for a gain notch of the at least one respective minus-90-degree phase-shift twin-tee notch filter 120 is adjusted to suppress the undesired mechanical modes of the MEMS gyro motor 100. In yet another implementation of this embodiment, both a frequency for a phase-transition point and a frequency for a gain notch of the at least one respective minus-90-degree phase-shift twin-tee notch filter 120 are adjusted. In yet another implementation of this embodiment, a variable resistor is controlled while calibrating the motor drive loop circuit to provide a minus 90 degree phase at a motor resonance frequency equal to the at least one primary-proof-mass mode while suppressing resonance at undesired mechanical modes of the motor during a startup of the motor. In yet another implementation of this embodiment, a capacitor value is adjusted while calibrating the motor drive loop circuit to provide a minus 90 degree phase at a motor resonance frequency equal to the at least one primary-proof-mass mode while suppressing resonance at undesired mechanical modes of the motor during a startup of the motor.

For the MEMS gyroscope 11 shown in FIG. 2, undesired mechanical modes of the MEMS gyroscope 11 are suppressed at the first minus-90-degree phase-shift twin-tee notch filter 121 and the undesired mechanical modes of the MEMS gyroscope 11 are suppressed at the second minus-90-degree phase-shift twin-tee notch filter 122.

At block 806, at least one respective primary-proof-mass mode is passed to the at least one respective motor 100 from the at least one respective minus-90-degree phase-shift twin-tee notch filter 120. Then, the at least one respective proof mass 140 in the MEMS gyroscope 11 is driven at the at least one respective primary-proof-mass mode by the at least one respective motor 100 and the respective at least one sense electrode 145 senses the position of the respective proof mass 140.

For the MEMS gyroscope 11 shown in FIG. 2, a first primary-proof-mass mode for the first proof mass 141 is passed to a first drive amplifier 131 from the first minus-90-degree phase-shift twin-tee notch filter 121. The first primary-proof-mass mode is passed from the first drive amplifier 131 to the first motor 101 with a gain maintained at a value of one (1). In this manner, the first primary-proof-mass mode is passed to the first motor 101 from the first minus-90-degree phase-shift twin-tee notch filter 121. The first motor 101 is configured to drive the first proof mass 141 to cause the first proof mass 141 to oscillate at a first primary-proof-mass mode. The first sense electrode 146 senses the position of the first proof mass 141.

For the MEMS gyroscope 11 shown in FIG. 2, the second primary-proof-mass mode for the second proof mass 142 is passed to a second drive amplifier 132 from the second minus-90-degree phase-shift twin-tee notch filter 122. The second primary-proof-mass mode is passed from the second drive amplifier 131 to the second motor 102 with a gain maintained at a value of one (1). In this manner, the second primary-proof-mass mode is passed to the second motor 102 from the second minus-90-degree phase-shift twin-tee notch filter 122. The second motor 102 configured to drive a second proof mass 142 to cause the second proof mass 142 to oscillate at the second primary-proof-mass mode. The second sense electrode 147 senses the position of the second proof mass 142. In one implementation of this embodiment, the second primary-proof-mass mode is the same as the first primary-proof-mass mode. In another implementation of this embodiment, the first primary-proof-mass mode and the second primary-proof-mass mode are equal to 10 kHz.

Example Embodiments

Example 1 includes a motor drive loop circuit for a micro-electro-mechanical system (MEMS) gyroscope, the motor drive loop circuit comprising: a motor configured to drive a proof mass in the MEMS gyroscope, the motor configured to cause the proof mass to oscillate at a primary-proof-mass mode; and a minus-90-degree phase-shift twin-tee notch filter configured to: provide a minus 90 degree phase at a motor resonance frequency equal to the primary-proof-mass mode; suppress resonance at undesired mechanical modes of the motor during a startup of the motor; and provide gain at the motor resonance frequency.

Example 2 includes the motor drive loop circuit of Example 1, wherein the minus-90-degree phase-shift twin-tee notch filter includes: a first resistor in series with a second resistor; a first capacitor in series with a second capacitor, the first capacitor in parallel with the first resistor and the second capacitor in parallel with the second resistor; a third capacitor connecting a common node of the first resistor and the second resistor to ground; and a third resistor connecting a common node of the first capacitor and the second capacitor to the ground.

Example 3 includes the motor drive loop circuit of Example 2, wherein the minus-90-degree phase-shift twin-tee notch filter further includes: an amplifier having a positive input communicatively coupled to the second resistor and the second capacitor and having a negative input communicatively coupled to input feedback from an output of the amplifier.

Example 4 includes a method to suppress undesired mechanical modes of a micro-electro-mechanical system (MEMS) gyroscope, the method comprising: coupling at least one pickoff signal to at least one respective minus-90-degree phase-shift twin-tee notch filter from at least one respective motor configured to drive at least one respective proof mass in the MEMS gyroscope; suppressing the undesired mechanical modes of the MEMS gyroscope at the at least one respective minus-90-degree phase-shift twin-tee notch filter; and passing at least one respective primary-proof-mass mode to the at least one respective motor from the at least one respective minus-90-degree phase-shift twin-tee notch filter.

Example 5 includes the method of Example 4, further comprising: driving the at least one respective proof mass in the MEMS gyroscope at the at least one respective primary-proof-mass mode from the at least one respective motor.

Example 6 includes the method of any of Examples 4-5, wherein suppressing the undesired mechanical modes of the MEMS gyroscope at the at least one respective minus-90-degree phase-shift twin-tee notch filter comprises: adjusting a frequency for a phase-transition point of the at least one respective minus-90-degree phase-shift twin-tee notch filter to suppress the undesired mechanical modes of the MEMS gyroscope.

Example 7 includes the method of Example 6, wherein suppressing the undesired mechanical modes of the MEMS gyroscope at the at least one respective minus-90-degree phase-shift twin-tee notch filter further comprises: adjusting a frequency for a gain notch of the at least one respective minus-90-degree phase-shift twin-tee notch filter to suppress the undesired mechanical modes of the MEMS gyroscope.

Example 8 includes the method of any of Examples 4-7, wherein suppressing the undesired mechanical modes of the MEMS gyroscope at the at least one respective minus-90-degree phase-shift twin-tee notch filter further comprises: adjusting a frequency for a gain notch of the at least one respective minus-90-degree phase-shift twin-tee notch filter to suppress the undesired mechanical modes of the MEMS gyroscope.

Example 9 includes the method of any of Examples 4-8, wherein coupling the at least one pickoff signal to the at least one respective minus-90-degree phase-shift twin-tee notch filter from the at least one respective motor comprises: coupling a first pickoff signal to a first minus-90-degree phase-shift twin-tee notch filter from a first motor configured to drive a first proof mass in the MEMS gyroscope, wherein suppressing the undesired mechanical modes of the MEMS gyroscope at the at least one respective minus-90-degree phase-shift twin-tee notch filter comprises: suppressing the undesired mechanical modes of the MEMS gyroscope at the first minus-90-degree phase-shift twin-tee notch filter, wherein passing the at least one primary-proof-mass mode to the at least one respective motor from the at least one respective minus-90-degree phase-shift twin-tee notch filter comprises: passing a first primary-proof-mass mode to the first motor from the first minus-90-degree phase-shift twin-tee notch filter.

Example 10 includes the method of Example 9, wherein coupling the first pickoff signal to the first minus-90-degree phase-shift twin-tee notch filter from the first motor comprises: coupling the first pickoff signal to a first charge amplifier; and coupling the amplified first pickoff signal to the first minus-90-degree phase-shift twin-tee notch filter from the first charge amplifier, wherein passing the first primary-proof-mass mode to the first motor from the first minus-90-degree phase-shift twin-tee notch filter comprises: passing the first primary-proof-mass mode to a first drive amplifier from the first minus-90-degree phase-shift twin-tee notch filter; and passing the first primary-proof-mass mode from the first drive amplifier to the first motor.

Example 11 includes the method of any of Examples 9-10, further comprising: arranging the first proof mass and a second proof mass to sense orthogonal forces; wherein coupling the at least one pickoff signal to at least one respective minus-90-degree phase-shift twin-tee notch filter from the at least one respective motor further comprises: coupling a second pickoff signal to a second minus-90-degree phase-shift twin-tee notch filter from a second motor configured to drive the second proof mass in the MEMS gyroscope, wherein suppressing the undesired mechanical modes of the MEMS gyroscope at the at least one respective minus-90-degree phase-shift twin-tee notch filter further comprises: suppressing the undesired mechanical modes of the MEMS gyroscope at the second minus-90-degree phase-shift twin-tee notch filter, wherein passing the at least one primary-proof-mass mode to the at least one respective motor from the at least one respective minus-90-degree phase-shift twin-tee notch filter further comprises: passing a second primary-proof-mass mode to the second motor from the second minus-90-degree phase-shift twin-tee notch filter.

Example 12 includes the method of Example 11, wherein coupling the second pickoff signal to the second minus-90-degree phase-shift twin-tee notch filter from the second motor comprises: coupling the second pickoff signal to a second charge amplifier; and coupling the amplified second pickoff signal to the second minus-90-degree phase-shift twin-tee notch filter from the second charge amplifier, wherein passing the second primary-proof-mass mode to the second motor from the second minus-90-degree phase-shift twin-tee notch filter comprises: passing the second primary-proof-mass mode to a second drive amplifier from the second minus-90-degree phase-shift twin-tee notch filter; and passing the second primary-proof-mass mode from the second drive amplifier to the second motor.

Example 13 includes the method of any of Examples 4-12, wherein coupling the at least one pickoff signal to the at least one respective minus-90-degree phase-shift twin-tee notch filter from the at least one respective motor configured comprises: coupling the at least one pickoff signal to at least one respective charge amplifier; and coupling the amplified at least one pickoff signal to the at least one respective minus-90-degree phase-shift twin-tee notch filter from the charge amplifier, wherein passing the at least one respective primary-proof-mass mode to the at least one respective motor from the at least one respective minus-90-degree phase-shift twin-tee notch filter comprises: passing the at least one respective primary-proof-mass mode to at least one respective drive amplifier from the at least one respective minus-90-degree phase-shift twin-tee notch filter; and passing the at least one respective primary-proof-mass mode from the at least one respective drive amplifier to the at least one respective motor.

Example 14 includes a micro-electro-mechanical system (MEMS) gyroscope configured to suppress undesired mechanical modes of a micro-electro-mechanical system (MEMS) gyroscope during a startup of the MEMS gyroscope, the gyroscope comprising: at least one proof mass; at least one respective motor drive loop circuit, the at least one motor drive loop circuit including: at least one motor configured to drive the at least one respective proof mass in the MEMS gyroscope, the at least one motor configured to cause the at least one respective proof mass to oscillate at a respective at least one primary-proof-mass mode; and at least one respective minus-90-degree phase-shift twin-tee notch filter configured to: provide a minus 90 degree phase at a motor resonance frequency equal to the at least one primary-proof-mass mode; suppress resonance at undesired mechanical modes of the at least one motor during a startup of the at least one motor; and provide gain at the motor resonance frequency.

Example 15 includes the gyroscope of Example 14, wherein the at least one proof mass includes: a first proof mass; and a second proof mass, and wherein the least one respective motor drive loop circuit, includes: a first motor drive loop circuit: and a second motor drive loop circuit.

Example 16 includes the gyroscope of Example 15, wherein the first motor drive loop circuit includes: a first motor configured to drive the first proof mass to cause the first proof mass to oscillate at a first primary-proof-mass mode; and a first minus-90-degree phase-shift twin-tee notch filter configured to: provide a minus 90 degree phase at a motor resonance frequency equal to the first primary-proof-mass mode of the first proof mass; suppress resonance at undesired mechanical modes of the MEMS gyroscope; and provide gain to the first primary-proof-mass mode of the first proof mass.

Example 17 includes the gyroscope of Example 16, wherein the first minus-90-degree phase-shift twin-tee notch filter includes: a first resistor in series with a second resistor; a first capacitor in series with a second capacitor, the first capacitor in parallel with the first resistor and the second capacitor in parallel with the second resistor; a third capacitor connecting a common node of the first resistor and the second resistor to ground; and a third resistor connecting a common node of the first capacitor and the second capacitor to the ground.

Example 18 includes the gyroscope of Example 17, wherein the first minus-90-degree phase-shift twin-tee notch filter further includes: an amplifier having a positive input communicatively coupled to the second resistor and the second capacitor and having a negative input communicatively coupled to input feedback from an output of the amplifier.

Example 19 includes the gyroscope of Example 18, wherein the wherein the second minus-90-degree phase-shift twin-tee notch filter includes: a fourth resistor in series with a fifth resistor; a fourth capacitor in series with a fifth capacitor, the fourth capacitor in parallel with the fourth resistor and the fifth capacitor in parallel with the fifth resistor; a sixth capacitor connecting a common node of the fourth resistor and the fifth resistor to the ground; and a sixth resistor connecting a common node of the fourth capacitor and the fifth capacitor to the ground.

Example 20 includes the gyroscope of Example 19, wherein the amplifier is a first amplifier, wherein the second minus-90-degree phase-shift twin-tee notch filter further includes: a second amplifier having a positive input communicatively coupled to the fifth resistor and the fifth capacitor and having a negative input communicatively coupled to input feedback from an output of the second amplifier.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A method to suppress undesired mechanical modes of a micro-electro-mechanical system (MEMS) gyroscope, the method comprising:
    coupling at least one pickoff signal to at least one respective minus-90-degree phase-shift twin-tee notch filter from at least one respective motor configured to drive at least one respective proof mass in the MEMS gyroscope;
    suppressing the undesired mechanical modes of the MEMS gyroscope at the at least one respective minus-90-degree phase-shift twin-tee notch filter; and
    passing at least one respective primary-proof-mass mode to the at least one respective motor from the at least one respective minus-90-degree phase-shift twin-tee notch filter.

2. The method of claim 1, further comprising:
    driving the at least one respective proof mass in the MEMS gyroscope at the at least one respective primary-proof-mass mode from the at least one respective motor.

3. The method of claim 1, wherein suppressing the undesired mechanical modes of the MEMS gyroscope at the at least one respective minus-90-degree phase-shift twin-tee notch filter comprises:
    adjusting a frequency for a phase-transition point of the at least one respective minus-90-degree phase-shift twin-tee notch filter to suppress the undesired mechanical modes of the MEMS gyroscope.

4. The method of claim 3, wherein suppressing the undesired mechanical modes of the MEMS gyroscope at the at least one respective minus-90-degree phase-shift twin-tee notch filter further comprises:
    adjusting a frequency for a gain notch of the at least one respective minus-90-degree phase-shift twin-tee notch filter to suppress the undesired mechanical modes of the MEMS gyroscope.

5. The method of claim 1, wherein suppressing the undesired mechanical modes of the MEMS gyroscope at the at least one respective minus-90-degree phase-shift twin-tee notch filter further comprises:
    adjusting a frequency for a gain notch of the at least one respective minus-90-degree phase-shift twin-tee notch filter to suppress the undesired mechanical modes of the MEMS gyroscope.

6. The method of claim 1, wherein coupling the at least one pickoff signal to the at least one respective minus-90-degree phase-shift twin-tee notch filter from the at least one respective motor comprises:
    coupling a first pickoff signal to a first minus-90-degree phase-shift twin-tee notch filter from a first motor configured to drive a first proof mass in the MEMS gyroscope,
    wherein suppressing the undesired mechanical modes of the MEMS gyroscope at the at least one respective minus-90-degree phase-shift twin-tee notch filter comprises:
    suppressing the undesired mechanical modes of the MEMS gyroscope at the first minus-90-degree phase-shift twin-tee notch filter,
    wherein passing the at least one primary-proof-mass mode to the at least one respective motor from the at least one respective minus-90-degree phase-shift twin-tee notch filter comprises:
    passing a first primary-proof-mass mode to the first motor from the first minus-90-degree phase-shift twin-tee notch filter.

7. The method of claim 6, wherein coupling the first pickoff signal to the first minus-90-degree phase-shift twin-tee notch filter from the first motor comprises:
    coupling the first pickoff signal to a first charge amplifier; and
    coupling the amplified first pickoff signal to the first minus-90-degree phase-shift twin-tee notch filter from the first charge amplifier, wherein passing the first primary-proof-mass mode to the first motor from the first minus-90-degree phase-shift twin-tee notch filter comprises:
passing the first primary-proof-mass mode to a first drive amplifier from the first minus-90-degree phase-shift twin-tee notch filter; and
passing the first primary-proof-mass mode from the first drive amplifier to the first motor.

8. The method of claim 6, further comprising:
arranging the first proof mass and a second proof mass to sense orthogonal forces;
wherein coupling the at least one pickoff signal to at least one respective minus-90-degree phase-shift twin-tee notch filter from the at least one respective motor further comprises:
coupling a second pickoff signal to a second minus-90-degree phase-shift twin-tee notch filter from a second motor configured to drive the second proof mass in the MEMS gyroscope,
wherein suppressing the undesired mechanical modes of the MEMS gyroscope at the at least one respective minus-90-degree phase-shift twin-tee notch filter further comprises:
suppressing the undesired mechanical modes of the MEMS gyroscope at the second minus-90-degree phase-shift twin-tee notch filter,
wherein passing the at least one primary-proof-mass mode to the at least one respective motor from the at least one respective minus-90-degree phase-shift twin-tee notch filter further comprises:
passing a second primary-proof-mass mode to the second motor from the second minus-90-degree phase-shift twin-tee notch filter.

9. The method of claim 8, wherein coupling the second pickoff signal to the second minus-90-degree phase-shift twin-tee notch filter from the second motor comprises:
coupling the second pickoff signal to a second charge amplifier; and
coupling the amplified second pickoff signal to the second minus-90-degree phase-shift twin-tee notch filter from the second charge amplifier,
wherein passing the second primary-proof-mass mode to the second motor from the second minus-90-degree phase-shift twin-tee notch filter comprises:
passing the second primary-proof-mass mode to a second drive amplifier from the second minus-90-degree phase-shift twin-tee notch filter; and
passing the second primary-proof-mass mode from the second drive amplifier to the second motor.

10. The method of claim 1, wherein coupling the at least one pickoff signal to the at least one respective minus-90-degree phase-shift twin-tee notch filter from the at least one respective motor comprises:
coupling the at least one pickoff signal to at least one respective charge amplifier; and
coupling the amplified at least one pickoff signal to the at least one respective minus-90-degree phase-shift twin-tee notch filter from the charge amplifier,
wherein passing the at least one respective primary-proof-mass mode to the at least one respective motor from the at least one respective minus-90-degree phase-shift twin-tee notch filter comprises:
passing the at least one respective primary-proof-mass mode to at least one respective drive amplifier from the at least one respective minus-90-degree phase-shift twin-tee notch filter; and passing the at least one respective primary-proof-mass mode from the at least one respective drive amplifier to the at least one respective motor.

11. A micro-electro-mechanical system (MEMS) gyroscope configured to suppress undesired mechanical modes during a startup of the MEMS gyroscope, the gyroscope comprising:
at least one proof mass including a first proof mass and a second proof mass; and
at least one respective motor drive loop circuit, the at least one motor drive loop circuit including:
at least one motor configured to drive the at least one respective proof mass in the MEMS gyroscope, the at least one motor configured to cause the at least one respective proof mass to oscillate at a respective at least one primary-proof-mass mode; and
at least one respective minus-90-degree phase-shift twin-tee notch filter configured to: provide a minus 90 degree phase at a motor resonance frequency equal to the at least one primary-proof-mass mode; suppress resonance at undesired mechanical modes of the at least one motor during a startup of the at least one motor; and provide gain at the motor resonance frequency;
wherein the least one respective motor drive loop circuit includes a first motor drive loop circuit and a second motor drive loop circuit.

12. The gyroscope of claim 11, wherein the first motor drive loop circuit includes:
a first motor configured to drive the first proof mass to cause the first proof mass to oscillate at a first primary-proof-mass mode; and
a first minus-90-degree phase-shift twin-tee notch filter configured to:
provide a minus 90 degree phase at a motor resonance frequency equal to the first primary-proof-mass mode of the first proof mass;
suppress resonance at undesired mechanical modes of the MEMS gyroscope; and
provide gain to the first primary-proof-mass mode of the first proof mass.

13. The gyroscope of claim 12, wherein the first minus-90-degree phase-shift twin-tee notch filter includes:
a first resistor in series with a second resistor;
a first capacitor in series with a second capacitor, the first capacitor in parallel with the first resistor and the second capacitor in parallel with the second resistor;
a third capacitor connecting a common node of the first resistor and the second resistor to ground; and
a third resistor connecting a common node of the first capacitor and the second capacitor to the ground.

14. The gyroscope of claim 13, wherein the first minus-90-degree phase-shift twin-tee notch filter further includes:
an amplifier having a positive input communicatively coupled to the second resistor and the second capacitor and having a negative input communicatively coupled to input feedback from an output of the amplifier.

15. The gyroscope of claim 14, wherein the second minus-90-degree phase-shift twin-tee notch filter includes:
a fourth resistor in series with a fifth resistor;
a fourth capacitor in series with a fifth capacitor, the fourth capacitor in parallel with the fourth resistor and the fifth capacitor in parallel with the fifth resistor;
a sixth capacitor connecting a common node of the fourth resistor and the fifth resistor to the ground; and
a sixth resistor connecting a common node of the fourth capacitor and the fifth capacitor to the ground.

16. The gyroscope of claim 15, wherein the amplifier is a first amplifier, wherein the second minus-90-degree phase-shift twin-tee notch filter further includes:

a second amplifier having a positive input communicatively coupled to the fifth resistor and the fifth capacitor and having a negative input communicatively coupled to input feedback from an output of the second amplifier.

* * * * *